United States Patent
Jones (10) Patent No.: US 10,017,273 B2
(45) Date of Patent: Jul. 10, 2018

(54) AIRCRAFT WING FLAP SKEW DETECTION SYSTEMS AND METHODS

(71) Applicant: THE BOEING COMPANY, Chicago, IL (US)

(72) Inventor: Kelly Thomas Jones, Snohomish, WA (US)

(73) Assignee: The Boeing Company, Chicago, IL (US)

(*) Notice: Subject to any disclaimer, the term of this patent is extended or adjusted under 35 U.S.C. 154(b) by 111 days.

(21) Appl. No.: 15/334,347

(22) Filed: Oct. 26, 2016

(65) Prior Publication Data

US 2018/0111697 A1   Apr. 26, 2018

(51) Int. Cl.
 *B64D 45/00* (2006.01)
 *G01M 5/00* (2006.01)

(52) U.S. Cl.
 CPC ....... *B64D 45/0005* (2013.01); *G01M 5/0016* (2013.01); *B64D 2045/001* (2013.01)

(58) Field of Classification Search
 CPC ................ B64D 2045/001; G01M 5/0016
 See application file for complete search history.

(56) References Cited

U.S. PATENT DOCUMENTS

| | | | | |
|---|---|---|---|---|
| 4,789,119 A | * | 12/1988 | Bellego | B64C 13/36 244/226 |
| 5,680,124 A | * | 10/1997 | Bedell | B64D 45/0005 244/194 |
| 5,686,907 A | * | 11/1997 | Bedell | B64D 45/0005 244/194 |
| 6,799,739 B1 | | 10/2004 | Jones | |
| 7,195,209 B2 | | 3/2007 | Schievelbusch | |

(Continued)

FOREIGN PATENT DOCUMENTS

| | | |
|---|---|---|
| EP | 2457825 | 5/2012 |
| FR | 2606363 | 5/1988 |

OTHER PUBLICATIONS

Extended European Search Report for EP 17187294.8-1010, dated Jan. 16, 2018.

*Primary Examiner* — Freddie Kirkland, III
(74) *Attorney, Agent, or Firm* — Joseph M. Butscher; The Small Patent Law Group, LLC (57) ABSTRACT

A flap skew detection system is configured to detect flap skew of one or more flaps moveably secured to one or more wings of an aircraft. The flap skew detection system includes a flap support assembly that couples a flap to a wing. The flap support assembly includes a fixed portion that is configured to secure to the wing, a moveable portion that is moveably coupled to the fixed portion and configured to securely support the flap, and a link moveably coupled to the fixed portion and the moveable portion. The link includes a cylinder defining an internal chamber including a hydraulic fluid chamber, a piston having a piston head within the internal chamber, and hydraulic fluid retained within the hydraulic fluid chamber. A pressure detector is fluidly coupled to the hydraulic fluid chamber. The pressure detector is configured to detect a fluid pressure of the hydraulic fluid pressure within the hydraulic fluid chamber. The fluid pressure detected by the pressure detector is used to determine existence of flap skew.

20 Claims, 5 Drawing Sheets

(56) References Cited

U.S. PATENT DOCUMENTS

| | | | |
|---|---|---|---|
| 8,505,848 B2* | 8/2013 | Fukui | B64C 13/42 244/99.2 |
| 8,746,625 B2 | 6/2014 | Recksick | |
| 8,868,261 B2 | 10/2014 | Recksick | |
| 9,102,398 B2* | 8/2015 | Vaghela | B64C 13/28 |
| 2012/0131912 A1* | 5/2012 | Fukui | B64C 13/42 60/405 |

* cited by examiner

AIRCRAFT WING FLAP SKEW DETECTION SYSTEMS AND METHODS

FIELD OF THE DISCLOSURE

Embodiments of the present disclosure generally relate to systems and methods for detecting skew of flaps of aircraft wings.

BACKGROUND OF THE DISCLOSURE

High-lift systems are utilized on wings of aircraft to increase lift or drag during take-offs and landings. One type of high-lift system includes flaps on trailing edges of the wings. The flaps are moveable control surfaces that may be extended during take-offs and landings, and retracted at cruising speeds.

A variety of actuation systems may be used to extend and retract trailing-edge flaps on a wing. One known type of actuation system includes two drive stations, with each drive station connected to an opposite side of the flap. In short, each flap is typically driven by a mechanical system from two locations on the flap.

A flap support couples a flap to a fixed portion of a wing. The flap support includes flap support ribs, an actuator, a link, a drive arm, and a carrier fitting. The actuator turns the drive arm, which moves the link, which, in turn, pushes or pulls on the carrier fitting. The carrier fitting rotates about a point relative to the fixed flap support ribs.

If the flap disconnects from one of the flap supports (for example, the link disconnects from the carrier fitting), the other flap support that remains coupled to the other end of the flap and the wing provides support for the entire flap plus air load. In this scenario, the flap experiences freewheeling skew. While the connected flap support is able to carry the resultant loads for a certain number of flights, the single flap support is unable to support the flap over an increased number of flights. That is, the single flap support is not designed to fully support the flap over numerous flights, as the single flap will wear at an increased rate and/or may be susceptible to failure due to fatigue.

Because the loss of both flap supports is potentially dangerous below a certain altitude, disconnected flap supports are to be detected as soon as possible; preferably within a single flight. In known aircraft, one or more position sensors are used to detect freewheeling skew. The position sensor(s) are used to detect flap deflections at a specific flight configuration and compared to the same deflection on the ground. If the difference between the two deflections exceeds a certain threshold, a skew alert is output, and the aircraft is then serviced during a maintenance operation.

With increased performance demands, airplane wings are becoming thinner and stiffer. Similarly, flaps are also becoming thinner and stiffer. For performance reasons, certain flaps may be so stiff that they do not sufficiently deflect so as to be detected by a position based sensor. As such, known methods of detecting skew using position based sensors may not be capable of detecting flap disconnects or freewheeling skew.

Other known methods of detecting flap skew directly measure the load in a drive mechanism, such as through strain gage based load cells. However, a strain gage based sensor is sensitive to unexpected and unaccounted loads, such as torsion introduced into a link due to friction. Also, strain gages are very small and include very small connecting wires, thereby rendering them relatively delicate when installed in a high vibration environment, such as a flap support which is located directly behind an aircraft engine. Further, strain gages are, by definition, fatigue machines. For instance, copper alloy strain gages may have less fatigue life (in cycles) than various parts to which they are attached. As such, strain gage based sensors may be too delicate and unreliable for use with flaps of wings.

SUMMARY OF THE DISCLOSURE

A need exists for a system and method for efficiently and effectively detecting flap skew of aircraft wings. A need exist for a system and method for quickly, accurately, and reliably detecting flap skew.

With those needs in mind, certain embodiments of the present disclosure provide a flap skew detection system that is configured to detect flap skew of one or more flaps moveably secured to one or more wings of an aircraft. The flap skew detection system includes a flap support assembly that couples a flap to a wing. The flap support assembly includes a fixed portion that is configured to secure to the wing, a moveable portion that is moveably coupled to the fixed portion and configured to securely support the flap, and a link moveably coupled to the fixed portion and the moveable portion. The link includes a cylinder defining an internal chamber including a hydraulic fluid chamber, a piston having a piston head within the internal chamber, and hydraulic fluid (such as an incompressible grease) retained within the hydraulic fluid chamber. A pressure detector is fluidly coupled to the hydraulic fluid chamber. The pressure detector is configured to detect a fluid pressure of the hydraulic fluid pressure within the hydraulic fluid chamber. The fluid pressure detected by the pressure detector is used to determine existence of flap skew.

In at least one embodiment, the flap skew detection system includes a flap skew detection unit in communication with the pressure detector. The flap skew detection unit receives a pressure signal indicative of the fluid pressure from the pressure detector. The flap skew detection unit determines the existence of flap skew through an analysis of the pressure signal. For example, the flap skew detection unit may compare the pressure signal to another pressure signal output from another pressure detector coupled to another flap support assembly that is coupled to the flap or another flap in order to determine the existence of flap skew. The flap skew detection unit outputs a flap skew alert signal upon determining that flap skew exists.

The fixed portion may include a support bracket that is configured to secure to the wing. The moveable portion may include a carrier fitting that is moveably coupled to the fixed support bracket.

In at least one embodiment, the pressure detector includes a pressure switch. Optionally, the pressure detector includes a pressure sensor.

The flap skew detection system may include a fluid fitting coupled to the cylinder. The fluid fitting is configured to allow fluid to be input into the hydraulic fluid chamber. The fluid fitting is configured to allow for testing of the pressure detector.

Certain embodiments of the present disclosure provide a flap skew detection method that is configured to detect flap skew of one or more flaps moveably secured to one or more wings of an aircraft. The flap skew detection method includes securing a fixed portion of a flap support assembly to a wing, moveably coupling a moveable portion of the flap support assembly to the fixed portion, securely supporting the flap with the moveable portion, moveably coupling a link to the fixed portion and the moveable portion, positioning a piston head of a piston within an internal chamber of the link, retaining hydraulic fluid within a hydraulic fluid chamber of the internal chamber, fluidly coupling a pressure detector to the hydraulic fluid chamber, detecting a fluid pressure of the hydraulic fluid within the hydraulic fluid chamber with a pressure detector, and determining existence of flap skew through the detecting the fluid pressure.

In at least one embodiment, the method includes communicatively coupling a flap skew detection unit to the pressure detector, and receiving (by the flap skew detection unit) a pressure signal indicative of the fluid pressure from the pressure detector. The determining includes analyzing (by the flap skew detection unit) the pressure signal to determine the existence of flap skew. In at least one embodiment, the analyzing includes comparing the pressure signal to another pressure signal output from another pressure detector coupled to another flap support assembly that is coupled to the flap or another flap in order to determine the existence of flap skew. The method may also include outputting (by the flap skew detection unit) a flap skew alert signal upon determining that flap skew exists.

In at least one embodiment, the method includes inputting fluid into the hydraulic fluid chamber fitting via a fluid fitting coupled to the cylinder, and testing the pressure detector based, at least in part, on the inputting.

Certain embodiments of the present disclosure provide an aircraft that includes a fuselage, a first wing outwardly extending from the fuselage, a first flap moveably secured to the first wing, a second wing outwardly extending from the fuselage opposite from the first wing, a second flap moveably secured to the first wing, and a flap skew detection system that is configured to detect flap skew of the first and second flaps, the flap skew detection system includes flap support assemblies that couple to the first and second flaps.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Embodiments of the present disclosure provide flap skew detection systems and methods that monitor loads within a load path of a flap support assembly, instead of through incremental position changes. Embodiments of the present disclosure provide a flap skew detection system and method that includes using a piston/cylinder link for flaps, in which hydraulic pressure of a hydraulic fluid in the cylinder is used to measure freewheeling flap skew, for example.

Figure 1:
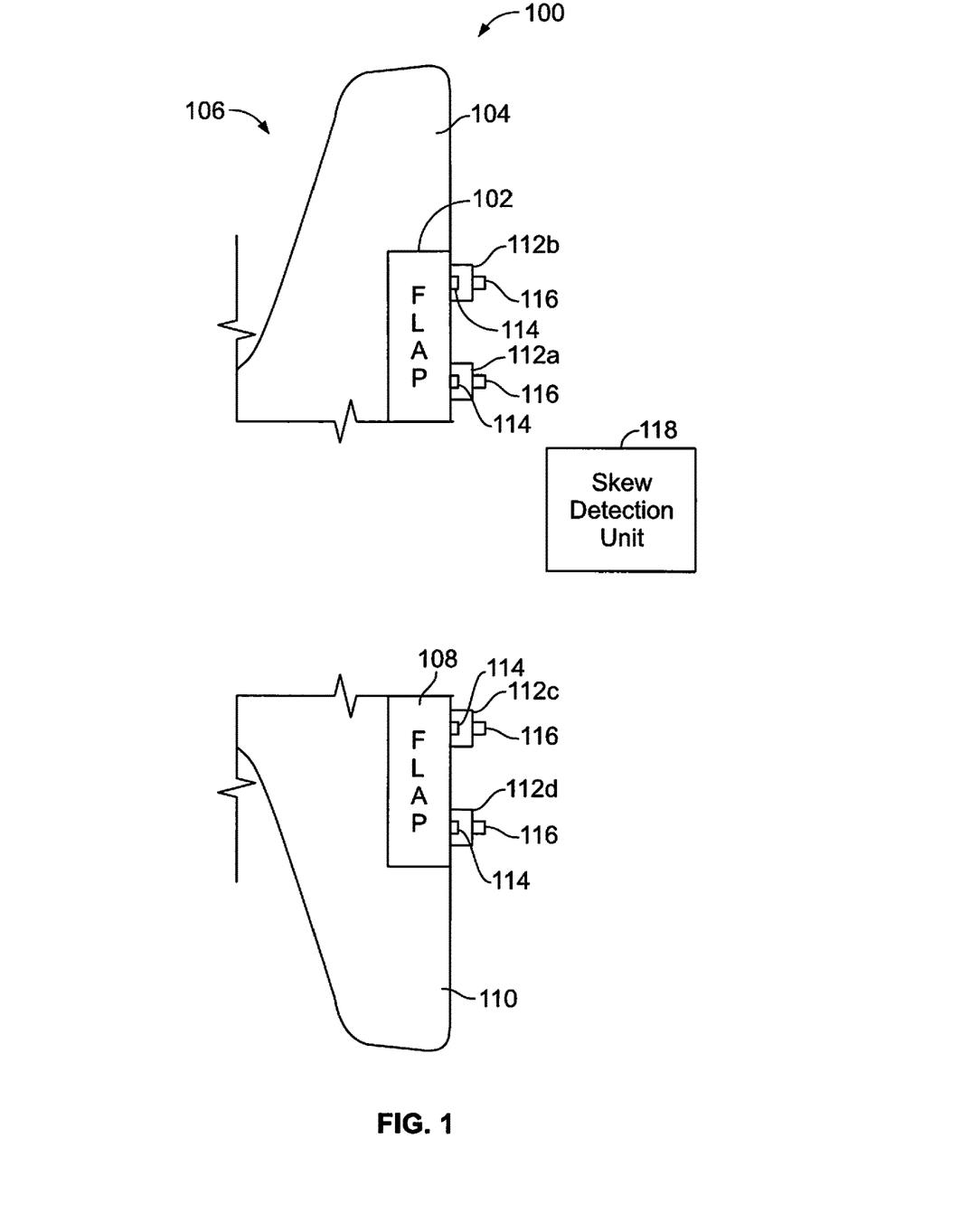
FIG. 1 is a schematic representation of a flap skew detection system, according to an embodiment of the present disclosure.

FIG. 1 is a schematic representation of a flap skew detection system 100, according to an embodiment of the present disclosure. The flap skew detection system 100 may include a flap 102 on a wing 104 of an aircraft 106 and a flap 108 on an opposite wing 110 of the aircraft 106. The flaps 102 and 108 may be trailing edge flaps on the wings 104 and 110, respectively.

The flap 102 is coupled to two flap support assemblies 112a and 112b, while the flap 108 is coupled to two flap support assemblies 112c and 112d. As shown, the flap support assemblies 112a and 112b are proximate to respective opposite ends of the flap 102, while the flap support assemblies 112c and 112d are proximate to respective opposite ends of the flap 108. The flap support assemblies 112b and 112d may be outboard, while the flap support assemblies 112a and 112c may be inboard.

Each of the flap support assemblies 112a, 112b, 112c, and 112d includes an actuator 114 that is configured to move the respective flaps 102 and 108 between retracted and extended positions. The actuators 114 may be electromechanical actuators that are configured to actuate the flaps 102 and 108 between retracted and extended positions. In at least one embodiment, the actuators 114 are geared rotary actuators. Optionally, the actuators 114 may be various other types of devices that are used to move the flaps 102 and 108. For example, the actuators 114 may be or include powered pivotal harnesses, linkages, and/or the like.

While the flap 102 is shown coupled to the two flap support assemblies 112a and 112b, and the flap 108 is shown coupled to the two flap support assemblies 112c and 112d, each of the flaps 102 and 108 may be coupled to additional flap support assemblies. For example, each of the flaps 102 and 108 may be coupled to three or more actuators.

The flap support assemblies 112a, 112b, 112c, and 112d also include a pressure detector 116. The pressure detectors 116 are configured to detect hydraulic fluid pressure within portions of the flap support assemblies 112a, 112b, 112c, and 112d. The pressure detectors 116 are configured to output pressure signals that are indicative of the hydraulic fluid pressure with the portions of the flap support assemblies 112a, 112b, 112c, and 112d. The pressure detectors 116 may be pressure switches, such as mechanical switches having one or more diaphragms, piezoelectric switches, or the like. In such an embodiment, a change in pressure changes a state of the pressure switch, and the pressure signals are output each time a state change occurs. In at least one other embodiment, the pressure detectors 116 may be pressure sensors, such as electronic pressure sensors, that continually monitor a hydraulic pressure and output a pressure signal.

A skew detection unit 118 is in communication with the pressure detectors 116, such as through one or more wired or wireless connections. The skew detection unit 118 may be located within a fuselage of the aircraft 106 (such as within an electronics bay, cockpit, and/or the like). In at least one other embodiment, the skew detection unit 118 is housed within at least one of the flap support assemblies 112a, 112b, 112c, or 112d. In another embodiment, the skew detection unit 118 is housed within a wing, fuselage, empennage, or the like of the aircraft 106. In at least one other embodiment, the skew detection unit 118 may be remotely located from the aircraft 106, such as within a land based monitoring station.

As shown, the skew detection unit 118 is in communication with each of the pressure detectors 116. In at least one other embodiment, a skew detection unit 118 may be in communication with the pressure detectors 116 of each flap 102 or 108. For example, a first skew detection unit 118 may be in communication with the pressure detectors 116 of the flap support assemblies 112a and 112b, while a second skew detection unit 118 may be in communication with the pressure detectors 116 of the flap support assemblies 112c and 112d. In at least one other embodiment, a separate and distinct skew detection unit 118 may be in communication with each of the pressure detectors 116. For example, four skew detection units 118 may be in communication with a respective pressure detector 116 of each flap support assembly 112a, 112b, 112c, and 112d.

In operation, the pressure detectors 116 are configured to detect variations in hydraulic pressure of portions of flap support assemblies 112a, 112b, 112c, and 112d. The skew detection unit 118 may include or be coupled to a memory that stores a pre-measured, non-freewheeling condition of the flaps 102 and 108, and/or a predetermined fluid pressure of the portions of the flap support assemblies that is correlated with a non-freewheeling condition. The skew detection unit 118 may also be used to detect a powered skew, such as may be caused by one or more of the flap support assemblies 112a, 112b, 112c, and/or 112d jamming. For example, if a received pressure signal is relatively low compared to an expected value for a specific flight condition, the skew detection unit 118 may determine that a disconnect in the load path exists. Similarly, if the pressure signal is higher than the expected value, the skew detection unit 118 may determine that an opposite flap support is carrying little or no load, or that a powered skew due to a jam is in progress.

As noted above, the pressure detectors 116 are in communication with the skew detection unit 118. The pressure detectors 116 output pressure signals to the skew detection unit 118, which analyzes the received pressure signals. For example, the skew detection unit 118 may compare the received pressure signals and determine if there is a difference therebetween. A difference between pressure signals may be interpreted by the skew detection unit 118 as an existence of flap skew. If the skew detection unit 118 determines that the received pressure signals are within a pre-determined acceptable range, the skew detection unit 118 determines that the flap support assemblies 112a, 112b, 112c, and 112d are securely coupled to the flaps 102 and 108 (that is, the flaps 102 and 108 are not in a freewheeling skew condition). If, however, the skew detection unit 118 determines that one or more of received pressure signals exceeds a predetermined skew threshold (for example, a threshold difference between pressure signals), the skew detection unit 118 determines that a freewheeling skew condition exists, and outputs a skew alert signal to a pilot, for example.

As used herein, the term "control unit," "unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the skew detection unit 118 may be or include one or more processors.

The skew detection unit 118 is configured to execute a set of instructions that are stored in one or more storage elements (such as one or more memories), in order to process data. For example, the skew detection unit 118 may include or be coupled to one or more memories. The storage elements may also store data or other information as desired or needed. The storage elements may be in the form of an information source or a physical memory element within a processing machine.

The set of instructions may include various commands that instruct the skew detection unit 118 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the skew detection unit 118. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the skew detection unit 118 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 2:
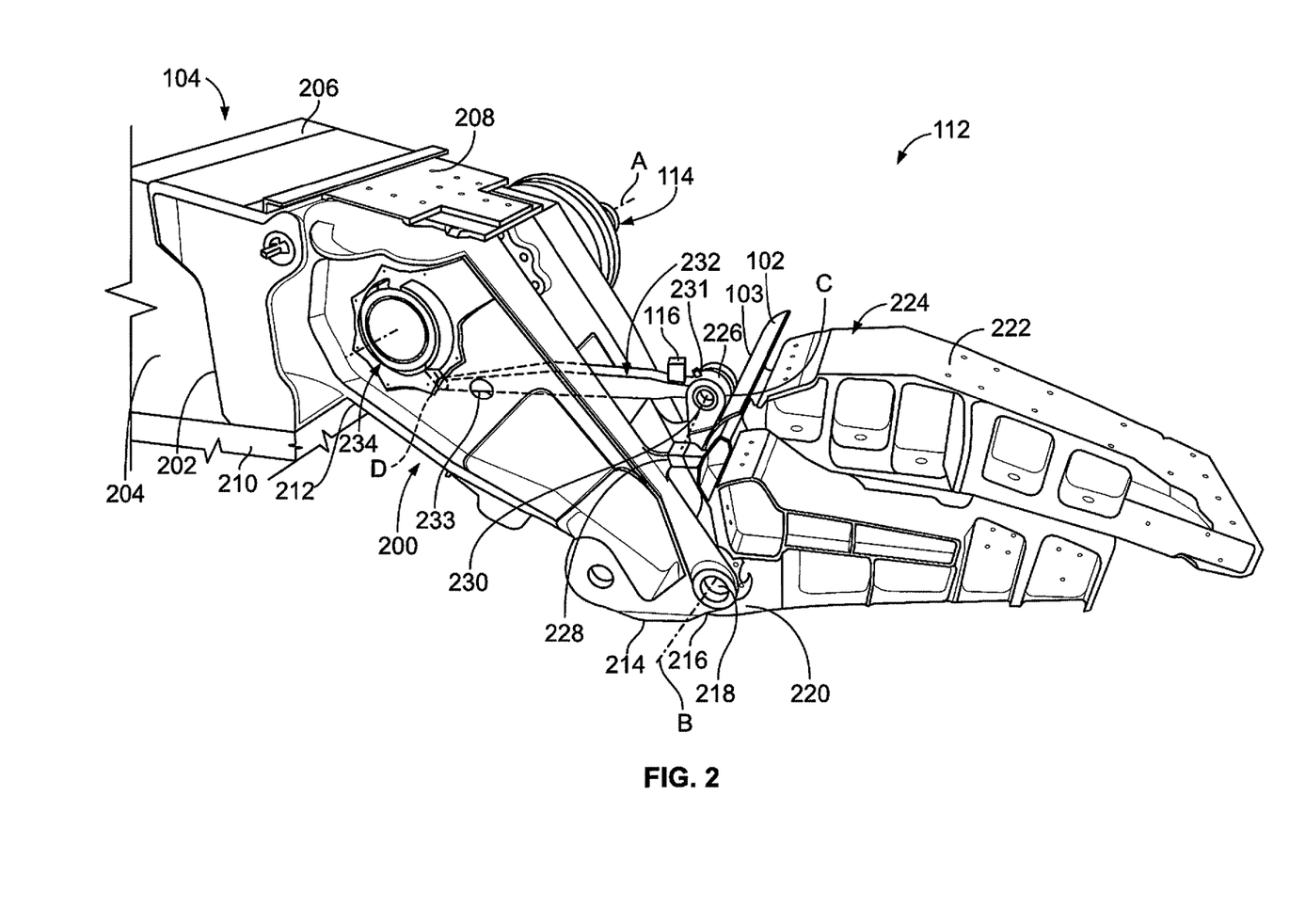
FIG. 2 is a diagrammatic representation of a lateral perspective view of a flap support assembly, according to an embodiment of the present disclosure.

FIG. 2 is a diagrammatic representation of a lateral perspective view of a flap support assembly 112, according to an embodiment of the present disclosure. For the sake of clarity, most of the flap 102 is not shown in FIG. 2. The flap support assembly 112 is an example of any of the flap support assemblies 112a, 112b, 112c, and 112d shown in FIG. 1. While the flap support assembly 112 is shown coupled to the wing 104 and the flap 102, it is to be understood that the flap support assembly 112 may be coupled to the wing 110 and the flap 108.

The flap support assembly 112 includes a support bracket 200 that is fixed to the wing 104. The support bracket 200 is an example of a fixed portion that secures to the wing 104. Optionally, the fixed portion may be or include one or more bracket(s), wall(s), beam(s), truss(es), and or the like of different shapes and sizes other than shown. A proximal end 202 of the support bracket 200 is fixed to a spar 204 of the wing 104, while an upper covering skin 206 is secured over at least a portion of a top 208 of the support bracket 200, and a lower covering skin 210 is secured over at least a portion of a bottom 212 of the support bracket 200. For clarity, only a portion of the wing 104 is shown. For example, in order to show the support bracket 200, portions of the covering skins 206 and 210 are not shown.

A distal end 214 of the support bracket 200 includes one or more bearings 216 that rotatably retain reciprocal pivot members 218 (such as bearings, posts, cylinders, rods, axles, and/or the like) extending outwardly from a lower proximal end 220 of a carrier fitting 222. The flap 102 is secured over an upper surface 224 of the carrier fitting 222. The carrier fitting 222 is an example of a moveable portion that is moveably coupled to the fixed portion, such as the support bracket 200. Optionally, the moveable portion may be or include one or more bracket(s), wall(s), beam(s), truss(es), and or the like of different shapes and sizes other than shown. For clarity, only a portion of the flap 102 is shown. In particular, only a leading nose 103 of the flap 102 is shown in FIG. 2.

Opposed lugs 226 extend upwardly from an upper proximal end 228 of the carrier fitting 222. The opposed lugs 226 securely retain a bearing 230 that rotatably couples to a distal end 231 of a link 232. An opposite end 233 of the link 232 is coupled to a drive arm 234 that is moveably secured to the support bracket 200. The actuator 114, such as a geared rotary actuator, is operatively coupled to the drive arm 234.

The pressure detector 116 is secured to the link 232. The pressure detector 116 is configured to detect hydraulic fluid pressure within the link 232.

The drive arm 234, the link 232, and the pivot members 218 retained within the bearings 216 cooperate to provide a four bar linkage. The axis of rotation of the drive arm 234 represents the A point, the axis of rotation of the pivot members 218 within the bearings(s) 216 represents the B point, the connection of the end 231 of the link 232 to the bearing(s) 230 represents the C point, while the connection of the end 233 of the link 232 to the drive arm 234 represents the D point.

In operation, the actuator 114 turns the drive arm 234. Rotation of the drive arm 234 pushes or pulls on the link 232. Motion (for example, pushing towards, or pulling away) pushes or pulls the carrier fitting 222. The carrier fitting 222 rotates about the B point relative to the support bracket 200. In this manner, the flap 102 may be actuated between extended and retracted positions.

Figure 3:
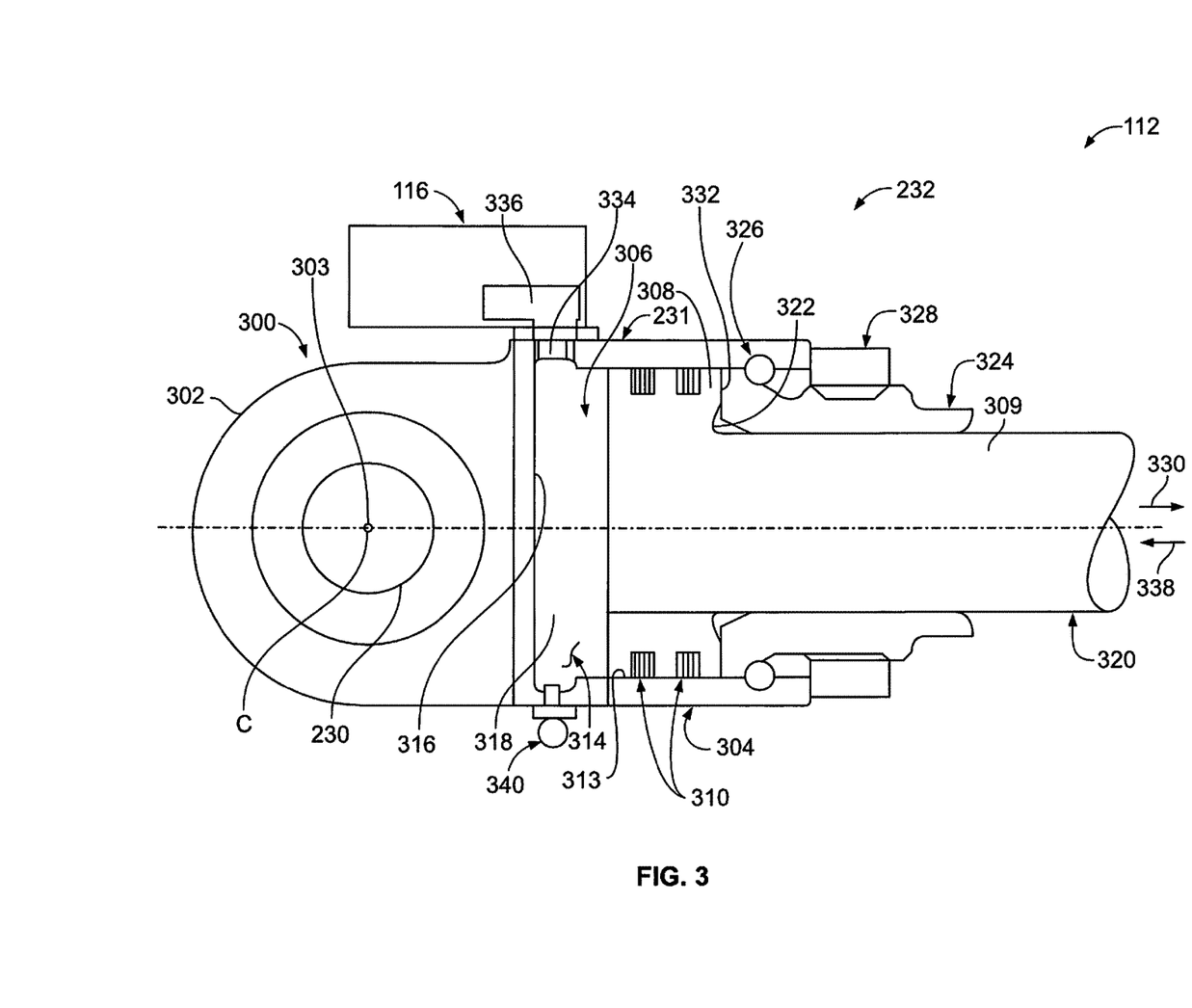
FIG. 3 is a diagrammatic representation of a lateral transverse cross-sectional view of a link of a flap support assembly, according to an embodiment of the present disclosure.

FIG. 3 is a diagrammatic representation of a lateral transverse cross-sectional view of the link 232 of the flap support assembly 112, according to an embodiment of the present disclosure. The link 232 includes a main body 300 that includes a coupling 302 that rotatably couples to the lugs 226 (shown in FIG. 2) of the carrier fitting 222 (shown in FIG. 2), such as through a spherical bearing 230. The axis of rotation 303 of the bearing 230 represents the C point, as described above. Optionally, the coupling 302 may be rotatably coupled to the drive arm 234 (shown in FIG. 2), in which case the bearing 230 would represent the D point.

The main body 300 also includes a cylinder 304 that extends distally away from the coupling 302. The cylinder 304 defines an internal chamber 306 into which a piston head 308 of a piston 309 is positioned. The piston head 308 includes one or more sealing members 310 (such as O-rings, gaskets, or the like) that sealingly engage an interior surface 313 of the cylinder 304 that defines the internal chamber 306.

A hydraulic fluid chamber 314 is positioned between the piston head 308 and an end wall 316 of the cylinder 304 that is proximate to the coupling 302. The hydraulic fluid chamber 314 retains a hydraulic fluid 318, such as an incompressible grease, oil, or the like. In at least one embodiment, the hydraulic fluid 318 is an incompressible, lithium-soap based grease.

A piston rod 320 of the piston 309 extends linearly away from the piston head 308 from a surface 322 that is opposite from the hydraulic fluid chamber 314. An opposite end (not shown) of the piston rod 320 couples to the drive arm 234 (shown in FIG. 2). A circumferential gland 324 extends around an outer circumferential portion of the piston rod 320. The gland 324 is secured in place by a shear wire 326 and a spanner nut 328, thereby preventing the piston 309 from moving further in the direction of arrow 330 when the surface 322 of the piston head 308 abuts into a proximal surface 332 of the gland 324. Alternatively, the gland 324 may be secured to the cylinder 304 through various other interfaces, such as threaded interfaces, fasteners, and/or the like. As noted above, a compressive force in the direction of arrow 330 exerted by a flap forces the piston head 308 against the proximal surface 332 of the gland 324.

A fluid channel 334 is formed through a portion of the cylinder 304 and fluidly couples to the hydraulic fluid chamber 314. The fluid channel 334 also fluidly couples to an internal cavity 336 of the pressure detector 116. In this manner, the fluid channel 334 fluidly connects the hydraulic fluid chamber 318 to the internal cavity 336 of the pressure detector 116.

A fluid fitting 340 may extend through a portion of the cylinder 304. The fluid fitting 340 may be a valve that fluidly couples to the hydraulic fluid chamber 314. In at least one other embodiment, the fluid fitting 340 may be a cap, plug, or the like that secures into a reciprocal channel formed through the cylinder 304. The fluid fitting 340 allows fluid to be input into the hydraulic fluid chamber 314.

Referring to FIGS. 1-3, during flight, a load on the link 232 is in compression. That is, the air load exerted into the flap 102 tends to retract the flap 102, thereby exerting compressive force in the direction of arrow 330 away from the coupling 302 into the link 232. The compressive force exerted in the direction of arrow 338 towards coupling 302 forces the piston head 308 away from the surface 332 of the gland 324. The compressive force is correlated with a fluid pressure of the hydraulic fluid 318 within the hydraulic fluid chamber 314. When the flap support assembly 112 is securely coupled to the wing 104 and the flap 102, a known fluid pressure of the hydraulic fluid 318 is detected by pressure detector 116. For example, when the piston head 308 is forced away from the surface 332 of the gland 324, a fluid pressure that correlates with a secure connection of the flap 102 to the wing 104 through the flap support assembly 112 exists. Notably, air load in the flap support assembly 112 is carried, in compression, from the distal end (not shown) of the piston rod 320 through the hydraulic fluid 318 and into the cylinder 304. The hydraulic fluid 318 provides a portion of the load path. The skew detection unit 118 receives the pressure signal from the pressure detector 116 and determines that the flap 102 is securely and operatively connected to the wing 104 via the flap support assembly 112. In at least one embodiment, when the skew detection unit 118 receives no pressure signal from the pressure detector 116 (such as when the pressure detector 116 is a switch, and a signal is received only upon a change of state of the switch), the skew detection unit 118 determines that the flap 102 is securely and operatively connected to the wing 104 via the flap support assembly 112. In at least one embodiment, the skew detection unit 118 may compare the pressure signal received by the pressure detector 116 with a predefined acceptable range. If the pressure signal is within the acceptable range, then the skew detection unit 118 determines that the flap 102 is securely and operatively connected to the wing 104.

If, however, the flap 102 disconnects from a secure and operative connection with the wing 104, such as if the link 232 disconnects from either the carrier fitting 222 and/or the support bracket 200, the compressive force in the direction of arrow 338 is reduced, and the piston 309 slides in an opposite direction as denoted by arrow 330. As the piston 309 linearly recedes within the cylinder 304 in the direction of arrow 330, the piston head 308 slides toward the proximal surface 332 of the gland 324, reducing the force on the incompressible hydraulic fluid 318, which then passes into the fluid channel 334 and the cavity 336, thereby changing the volume of hydraulic fluid 318 within the cavity 336. The pressure detector 116 detects the fluid pressure change through the hydraulic fluid 318 entering the cavity 336, and outputs the variation in pressure as the pressure signal, which is received by the skew detection unit 118. If the pressure change exceeds a predetermined threshold (such as a skew threshold that represents a particular difference between pressure signals of two different links 232 coupled to one flap or different flaps), the skew detection unit 118 determines that flap skew is present. At this point, the skew detection unit 118 outputs a skew alert to a computer, workstation, handheld device, or the like onboard the aircraft 106 to alert flight personnel of the skew condition.

While the link 232 is shown having a single hydraulic fluid chamber 314, an additional hydraulic fluid chamber may be positioned on an opposite side of the piston head 308, which allows for determination of tensions loads in the link 232. In this embodiment, the pressure detector 116 or another pressure detector may be in fluid communication with the additional hydraulic fluid chamber. The skew detection unit 118 may determine skew conditions based on pressure signals based on hydraulic fluid pressure within each of the hydraulic fluid chambers.

As described above, embodiments of the present disclosure provide a system and method for detecting flap skew of a wing of an aircraft. In at least one embodiment, the method includes configuring the link 232 to include the cylinder 304 and the piston head 308. The hydraulic fluid chamber 314 is filled with the hydraulic fluid 318. The piston 309 is coupled to the carrier fitting 222 and the support bracket 200. As such, the load on the flap 102 is directly transmitted to the piston 309. The pressure detector 116 detects a pressure of the hydraulic fluid 318 within the hydraulic fluid chamber 314. The skew detection unit 118 compares the detected pressure of the hydraulic fluid 318 within the hydraulic fluid chamber 314 to a pre-measured, non-freewheeling condition of the flap 102, or with fluid pressure of hydraulic fluid of a different link 232 coupled to the same flap 102 or another flap 108 of the aircraft 106. When the skew detection unit 118 detects a fluid pressure variation that exceeds a predefined threshold, the skew detection unit 118 determines that a skew condition is present and outputs an alert signal to personnel aboard the aircraft.

When the link 232 decouples from either the carrier fitting 222 or the support bracket 200, the normal compressive force of the flap 102 is no longer translated from the flap 102 into the link 232. Therefore, the piston head 320 recedes within the cylinder 304 in the direction of arrow 330, which no longer forces the hydraulic fluid 318 into the pressure detector 116, thereby decreasing the fluid pressure therein. The change in fluid pressure is output as a pressure signal to the skew detection unit 118, which indirectly determines the actual load on the flap support 102 through analysis of the fluid pressure signal, which is indicative of the fluid pressure of the hydraulic fluid 318 within the hydraulic fluid chamber 314. When fluid pressure within the hydraulic chamber 312 is compared to either the other support on the same flap, or a mirror image support on the other wing, unexpected excursions in load (either high, low, or none) may be interpreted as a skew event.

In at least one embodiment, the available stroke of the cylinder 304 is limited such that in the event of a loss of fluid, the piston head 308 bottoms on the end wall 316 and provides a suitable load path.

The pressure detector 116 may be checked on the ground during maintenance by pressurizing the pressure detector 116 through the fluid fitting 340, for example. For example, fluid may be input into the hydraulic fluid chamber 314 through the fluid fitting 340 and pressure signals output by the pressure detector 116 may be monitored to ensure that the pressure signals are commensurate with the additional fluid pressure caused by the increased fluid volume. After testing, the internal pressure may be relieved. As such, the fluid fitting 340 allows for the pressure detector 116 to be tested to ensure proper functioning.

Figure 4:
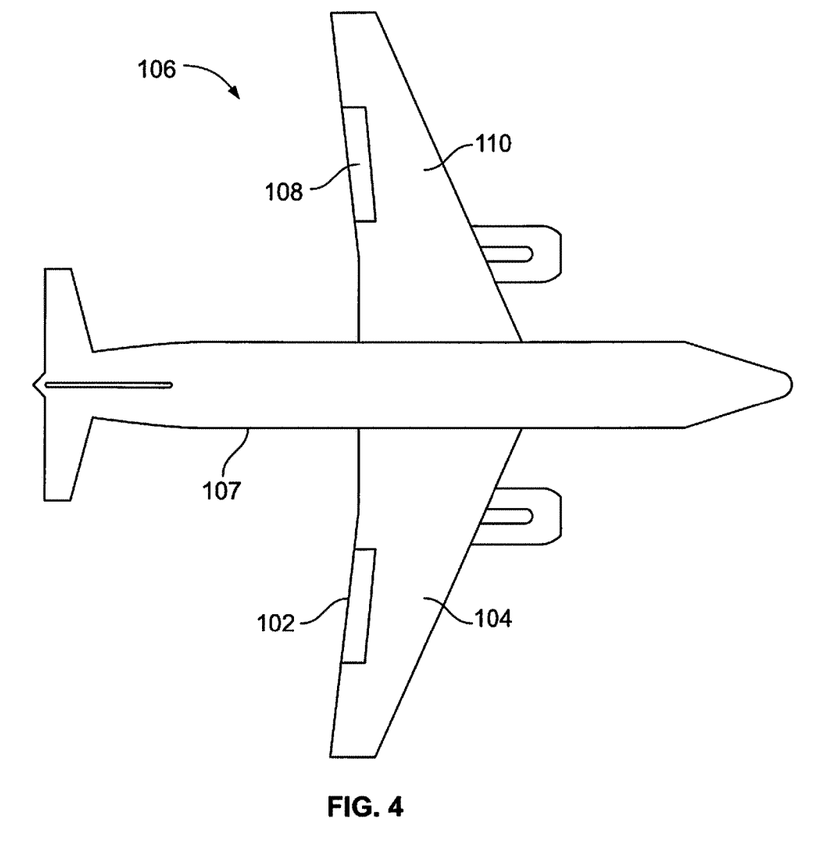
FIG. 4 is a diagrammatic representation of a top plan view of an aircraft, according to an embodiment of the present disclosure.

FIG. 4 is a diagrammatic representation of a top plan view of the aircraft 106, according to an embodiment of the present disclosure. The aircraft 106 includes a fuselage 107 and the wings 104 and 110 extending from respective right and left sides of the fuselage 107. The wings 104 and 110 include the extendable flaps 102 and 108 that are configured to increase drag or lift when extended from a trailing edge of the wings 104 and 110. The flaps 102 and 108 are part of a high-lift system implemented in the aircraft 106. Although one flap is illustrated on each wing 104 and 110, it is to be understood that multiple flaps may be installed on each of the wings 104 and 110.

Figure 5:
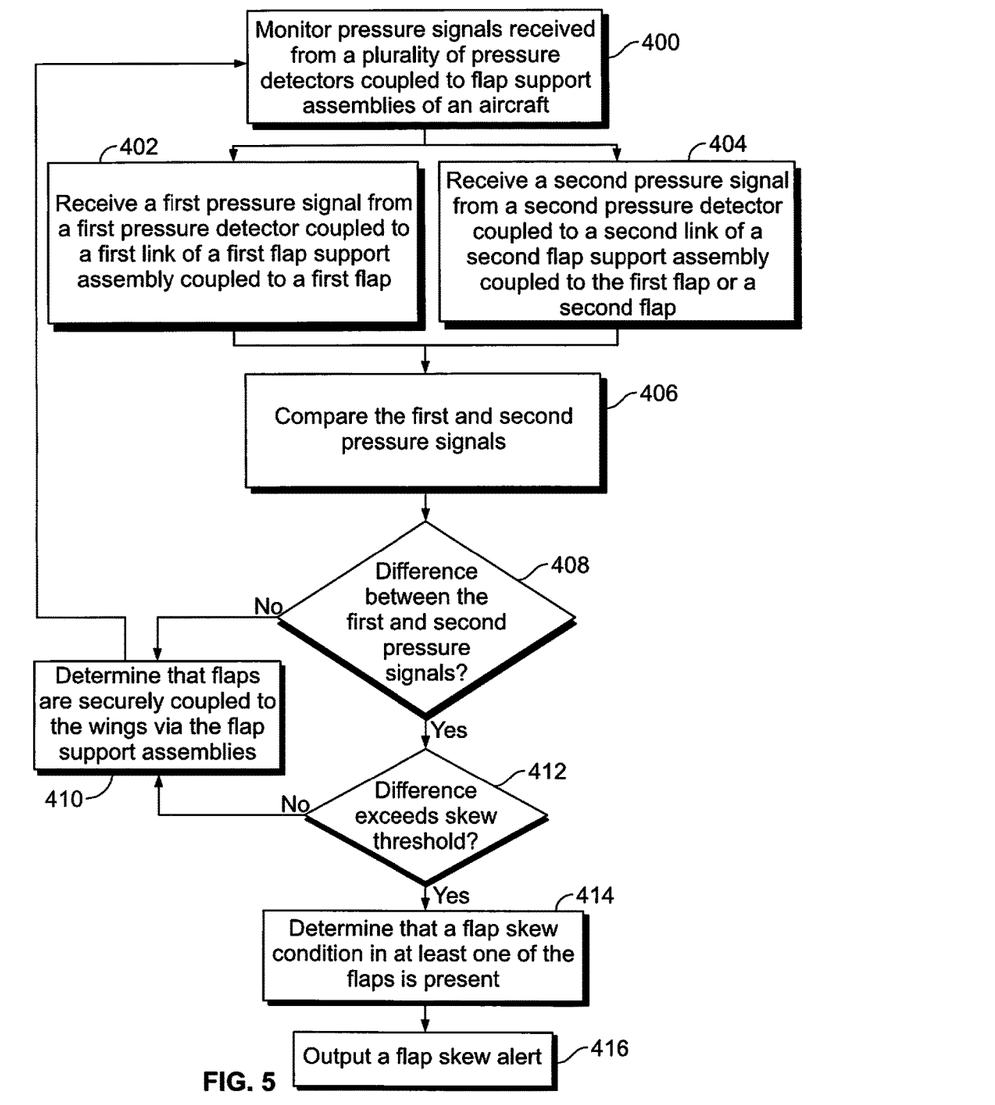
FIG. 5 illustrates a flow chart of a method of detecting flap skew of one or more wings of an aircraft, according to an embodiment of the present disclosure.

FIG. 5 illustrates a flow chart of a method of detecting flap skew of one or more wings 104 or 110 of an aircraft 106, according to an embodiment of the present disclosure. Referring to FIGS. 1-5, the method begins at 400, at which the skew detection unit 118 monitors pressure signals received from a plurality of pressure detectors 116 coupled to flap support assemblies 112 of the aircraft 106. At 402, the skew detection unit 118 receives a first pressure signal (indicative of hydraulic fluid pressure) from a first pressure detector 116 coupled to a first link 232 of a first flap support assembly 112 coupled to a first flap 102. At 404, the skew detection unit 118 receives a second pressure signal from a second pressure detector 116 coupled to a second link 232 of a second flap support assembly 112 coupled to the first flap 102 or a second flap 108. Steps 402 and 404 may occur simultaneously, or in a staggered fashion. In at least one embodiment, step 402 may occur before or after step 404.

At 406, the skew detection unit 118 compares the received first and second pressure signals. At 408, the skew detection unit 118 determines if there is a difference between the first and second pressure signals. If not, the method proceeds to 410, in which the skew detection unit 118 determines that the flaps 102 and 108 are securely coupled to the wings 104 and 110 via the flap support assemblies 112. The method then returns to 400.

If, however, there is a difference between the first and second pressure signals, the method proceeds from 408 to 412, at which the skew detection unit 118 determines if the difference exceeds a predefined skew threshold. If the difference does not exceed the skew threshold, the method proceeds to 410, and then back to 400.

If, however, the difference does exceed the skew threshold at 412, the method proceeds to 414, at which the skew detection unit 118 determines that a flap skew condition in at least one of the flaps 102 or 108 is present. Then, at 416, the skew detection unit 118 outputs a flap skew alert 416 to aircraft and/or maintenance personnel to check the flaps 102 and 108.

As another example, if a received pressure signal is relatively low compared to an expected value for a specific flight condition, the skew detection unit 118 may determine that a disconnect in the load path exists. Similarly, if the pressure signal is higher than the expected value, the skew detection unit 118 may determine that an opposite flap support is carrying little or no load, or that a powered skew due to a jam is in progress. In short, the values of the pressure signals allow sophisticated health monitoring of the flap support load paths.

As described above, embodiments of the present disclosure provide systems and methods for efficiently and effectively detecting flap skew of aircraft wings. Embodiments of the present disclosure provide systems and methods of quickly, accurately, and reliably detecting flap skew of aircraft wings.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A flap skew detection system that is configured to detect flap skew of one or more flaps moveably secured to one or more wings of an aircraft, the flap skew detection system comprising:
   a flap support assembly that couples a flap to a wing, the flap support assembly including:
      a fixed portion that is configured to secure to the wing;
      a moveable portion that is moveably coupled to the fixed portion, wherein the moveable portion is configured to securely support the flap;
      a link moveably coupled to the fixed portion and the moveable portion, wherein the link includes: (a) a cylinder defining an internal chamber including a hydraulic fluid chamber, (b) a piston having a piston head within the internal chamber, and (c) hydraulic fluid retained within the hydraulic fluid chamber; and
   a pressure detector fluidly coupled to the hydraulic fluid chamber, wherein the pressure detector is configured to detect a fluid pressure of the hydraulic fluid pressure within the hydraulic fluid chamber, wherein the fluid pressure detected by the pressure detector is used to determine existence of flap skew.

2. The flap skew detection system of claim 1, further comprising a flap skew detection unit in communication with the pressure detector, wherein the flap skew detection unit receives a pressure signal indicative of the fluid pressure from the pressure detector, and wherein the flap skew detection unit determines the existence of flap skew through an analysis of the pressure signal.

3. The flap skew detection system of claim 2, wherein the flap skew detection unit is configured to compare the pressure signal to another pressure signal output from another pressure detector coupled to another flap support assembly that is coupled to the flap or another flap in order to determine the existence of flap skew.

4. The flap skew detection system of claim 2, wherein the flap skew detection unit outputs a flap skew alert signal upon determining that flap skew exists.

5. The flap skew detection system of claim 1, wherein the fixed portion comprises a support bracket that is configured to secure to the wing.

6. The flap skew detection system of claim 1, wherein the moveable portion comprises a carrier fitting that is moveably coupled to the fixed portion.

7. The flap skew detection system of claim 1, wherein the pressure detector comprises a pressure switch.

8. The flap skew detection system of claim 1, wherein the pressure detector comprises a pressure sensor.

9. The flap skew detection system of claim 1, further comprising a fluid fitting coupled to the cylinder, wherein the fluid fitting is configured to allow fluid to be input into the hydraulic fluid chamber, and wherein the fluid fitting is configured to allow for testing of the pressure detector.

10. The flap skew detection system of claim 1, wherein the hydraulic fluid is incompressible grease.

11. A flap skew detection method that is configured to detect flap skew of one or more flaps moveably secured to one or more wings of an aircraft, the flap skew detection method comprising:
    securing a fixed portion of a flap support assembly to a wing;
    moveably coupling a moveable portion of the flap support assembly to the fixed portion;
    securely supporting the flap with the moveable portion;
    moveably coupling a link to the fixed portion and the moveable portion;
    positioning a piston head of a piston within an internal chamber of the link;
    retaining hydraulic fluid within a hydraulic fluid chamber of the internal chamber;
    fluidly coupling a pressure detector to the hydraulic fluid chamber;
    detecting a fluid pressure of the hydraulic fluid within the hydraulic fluid chamber with the pressure detector; and
    determining existence of flap skew through the detecting the fluid pressure.

12. The flap skew detection method of claim 11, further comprising:
    communicatively coupling a flap skew detection unit to the pressure detector;
    receiving, by the flap skew detection unit, a pressure signal indicative of the fluid pressure from the pressure detector; and
    wherein the determining comprises analyzing, by the flap skew detection unit, the pressure signal to determine the existence of flap skew.

13. The flap skew detection method of claim 12, wherein the analyzing comprises comparing the pressure signal to another pressure signal output from another pressure detector coupled to another flap support assembly that is coupled to the flap or another flap in order to determine the existence of flap skew.

14. The flap skew detection method of claim 12, further comprising outputting, by the flap skew detection unit, a flap skew alert signal upon determining that flap skew exists.

15. The flap skew detection method of claim 11, wherein the fixed portion comprises a support bracket that is configured to secure to the wing.

16. The flap skew detection method of claim 11, wherein the moveable portion comprises a carrier fitting that is moveably coupled to the fixed portion.

17. The flap skew detection method of claim 11, wherein the pressure detector comprises a pressure switch, or a pressure sensor.

18. The flap skew detection method of claim 11, further comprising:
    inputting fluid into the hydraulic fluid chamber fitting via a fluid fitting coupled to a cylinder defining an internal chamber including the hydraulic fluid chamber; and
    testing the pressure detector based, at least in part, on the inputting.

19. An aircraft comprising:
    a fuselage;
    a first wing outwardly extending from the fuselage;
    a first flap moveably secured to the first wing;
    a second wing outwardly extending from the fuselage opposite from the first wing;
    a second flap moveably secured to the first wing; and
    a flap skew detection system that is configured to detect flap skew of the first and second flaps, the flap skew detection system comprising flap support assemblies that couple to the first and second flaps, wherein each of the flap support assemblies includes:
        a fixed support bracket that fixed to one of the first or second wings;
        a moveable carrier fitting that is moveably coupled to the fixed support bracket, wherein the carrier fitting securely support one of the first or second flaps;
        a link moveably coupled to the support bracket and the carrier fitting, wherein the link includes: (a) a cylinder defining an internal chamber including a hydraulic fluid chamber, (b) a piston having a piston head within the internal chamber, and (c) an incompressible hydraulic fluid retained within the hydraulic fluid chamber;
        a pressure detector fluidly coupled to the hydraulic fluid chamber, wherein the pressure detector is configured to detect a fluid pressure of the hydraulic fluid pressure within the hydraulic fluid chamber, wherein the fluid pressure detected by the pressure detector is used to determine existence of flap skew of one or both of the first and second flaps; and
        a fluid fitting coupled to the cylinder, wherein the fluid fitting is configured to allow fluid to be input into the hydraulic fluid chamber, and wherein the fluid fitting is configured to allow for testing of the pressure detector.

20. The aircraft of claim 19, wherein the flap skew detection system further comprises a flap skew detection unit in communication with the pressure detector, wherein the flap skew detection unit receives a pressure signal indicative of the fluid pressure from the pressure detector, wherein the flap skew detection unit determines the existence of flap skew through an analysis of the pressure signal, wherein the flap skew detection unit is configured to compare the pressure signal to another pressure signal output from another pressure detector coupled to another flap support assembly that is coupled to the flap or another flap in order to determine the existence of flap skew, wherein the flap skew detection unit outputs a flap skew alert signal upon determining that flap skew exists.

* * * * *